Aug. 6, 1929.  F. W. MANNING  1,723,741
MAGAZINE FILTER
Filed April 28, 1926   2 Sheets-Sheet 2

INVENTOR.
Fred W. Manning
BY
ATTORNEY.

Patented Aug. 6, 1929.

1,723,741

UNITED STATES PATENT OFFICE.

FRED W. MANNING, OF BERKELEY, CALIFORNIA, ASSIGNOR TO STEWART-WARNER CORPORATION, OF CHICAGO, ILLINOIS, A CORPORATION OF VIRGINIA.

MAGAZINE FILTER.

Application filed April 28, 1926. Serial No. 105,265.

This invention relates to the treatment of liquids for effecting their purification or other desired improvements in their characteristics, but more particularly it relates to a method and means for the continuous purification of motor lubricating oils of internal combustion engines during their operation, by passing such oils through suitable treating agents.

The solid impurities of lubricating oils such as metallic particles, sand, etc., can readily be eliminated by means of various filter fabrics and thereby the life of the engine prolonged and the drainage and waste of the oil be made less frequent. However, in order that engine troubles be completely eliminated as far as the lubrication of its moving parts are concerned, and that there be no waste whatever of the lubricant, the fine particles of free carbon and certain colloidal matter in addition to the metallic particles, sand, etc., must also be removed. This is exceedingly difficult to accomplish by means of filter fabrics alone.

It is therefore an object of this invention to provide an economical method and apparatus for continuously treating a lubricant when in use, by passing it through a suitable treating agent on a fabric, whereby all solid and colloidal impurities are eliminated.

It is also an object of this invention to provide a balance valve used in conjunction with a floater which will make possible the maintaining of a substantially constant pressure in the lubricating system at all times and which will permit the same or a lower pressure as required to be used within the filter.

It is still a further object of this invention to provide means whereby the treating agent is removed from use at a constant rate of speed.

With the above and other objects in view, the invention will be understood by reference to the following description, taken in conjunction with the accompanying drawings, which illustrate a preferred form of apparatus for carrying out my invention.

Referring to the drawings:—

Figure 1:
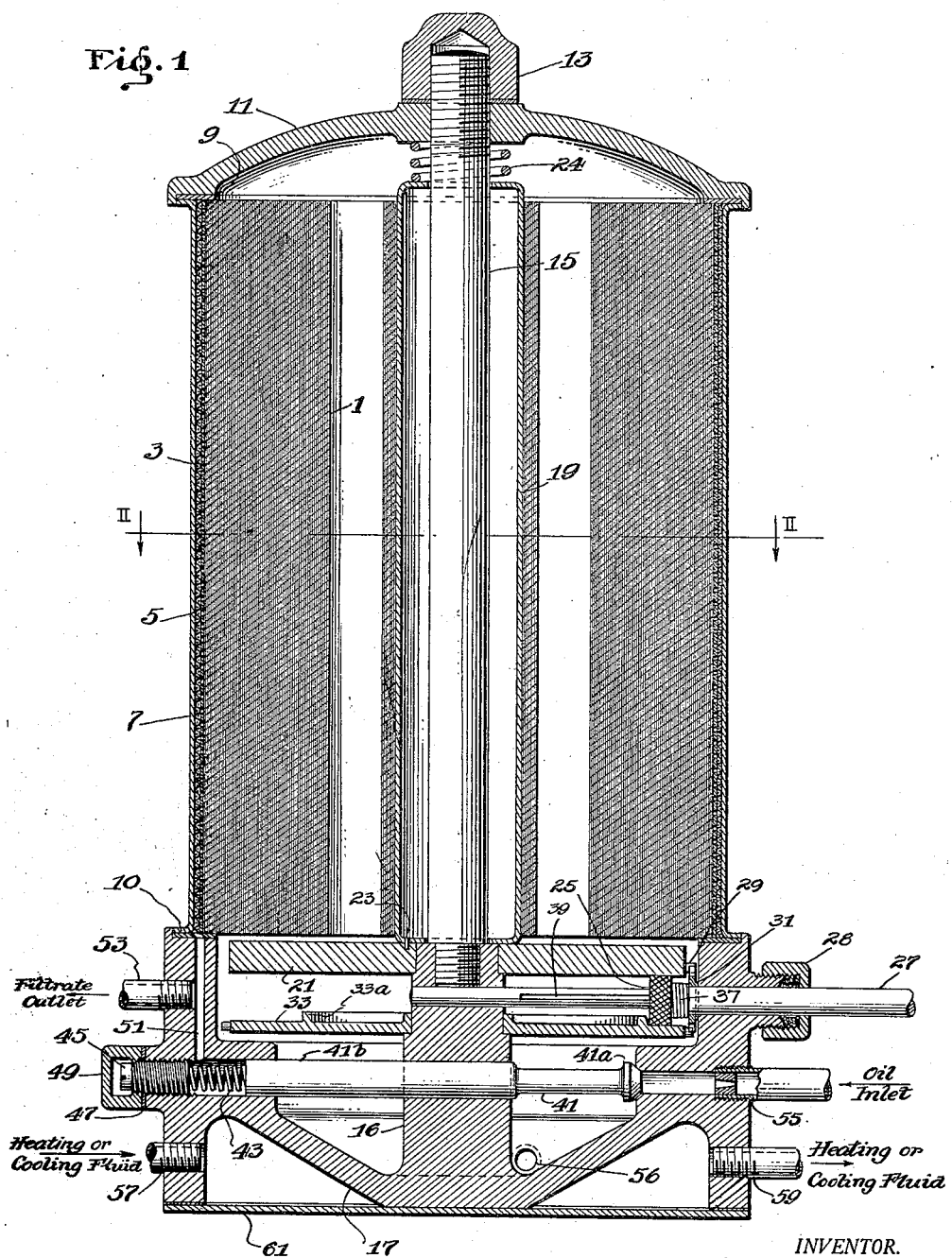
Figure 1 is a section through the center of the filter.

In accordance with this invention, the filter fabric or belt 1 may serve to eliminate a certain amount of the coarser solid contaminations of the oil but generally I prefer to use it simply as a carrier for the treating agent and for this purpose a thin open-mesh fabric such as muslin, cheesecloth, gauze, etc. is suitable. The treating agent may be cotton fibre, paper pulp, asbestos, kieselguhr, bone char, vegetable carbon, fuller's earth, etc. and any one of such agents may be used alone or in combinations with others.

The ends of the annular roll of fabric windings may be shellacked, but this will seldom be necessary as the combination and cohesion of the fabric windings with their thin coatings of treating agent will usually prevent any collapse of the roll during inaction of the filter. The roll is wrapped on the inside of a perforated filter drum 3 encircled by drainage screen 5 and the filter casing 7. Cork gaskets 9 and 10 are placed between the filter casing and the top cover 11 and sump pan 17 respectively, and the joints are made tight by means of cap nut 13 on bolt 15 threaded into the central boss 16 of the sump pan 17. Winding spool 19 engages with and is held in position on the friction plate 21 by means of pin 23 and spring 24, and the friction plate is rotated by means of driver wheel 25 frictionally engaging the plate and secured on the end of speedometer or other suitable drive shaft 27, whose entrance to the sump pan is made tight by means of stuffing box 28.

Figure 5:
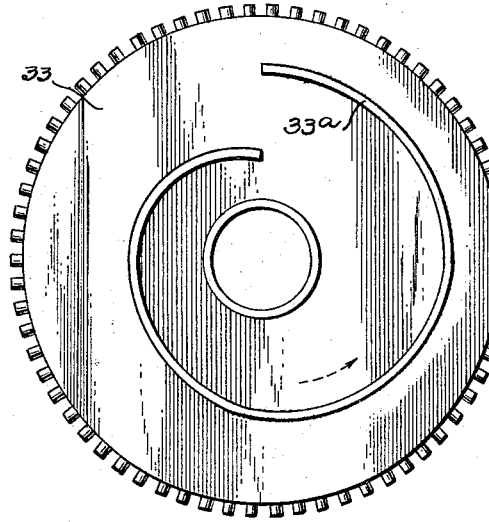
Figure 5 is a plan view of the speed control plate for regulating the speed of the friction drive.

The pin 29 on the perimeter of the friction plate engages with star wheel 31, which is journaled upon the shaft 27, so that with every revolution of the plate the star wheel rotates the speed control plate 33 one tooth, thus causing the spiral guide 33ª on the upper side of the plate to move the driver wheel 25 outwardly thereby reducing the rotative speed of the spool. The spiral guide is such that the winding speed of the spool at its smallest diameter is approximately the same as at its greatest diameter, when it with the exhausted windings practically fills the filter casing. After the treating agent and its fabric carrier have been completely exhausted and wound upon the storage spool, the driver wheel will run off the outer end of the spiral guide, shown in Figure 5, and the spring 37 will cause the wheel to be carried back over feather key 39 to its original position. This spring surrounds the portion of the shaft, 27, between the star wheel, 31, and the driver wheel 25 while the feather key drives the driver wheel from the shaft and allows movement of the driver wheel axially relative to the shaft.

Balance valve rod 41 consisting of valve 41ª and plunger 41ᵇ is supported by the central boss 16 and this valve rod is loaded by spring 43, the pressure of which is adjusted by screw 45, the outer end of which is enclosed by gasket 47 and cap nut 49 to prevent leakage. Any leakage past the plunger finds its way through the channel 51 and filtrate outlet 53. Oil to be filtered enters through the restricted orifice connection 55 and may be drained at 56. Heating gases from the exhaust manifold, hot water from the engine jacket, or cold water from the bottom of the radiator, may enter a chamber in the base of the sump pan at 57 and leave at 59, base plate 61 forming the closure for the chamber.

Figure 2:
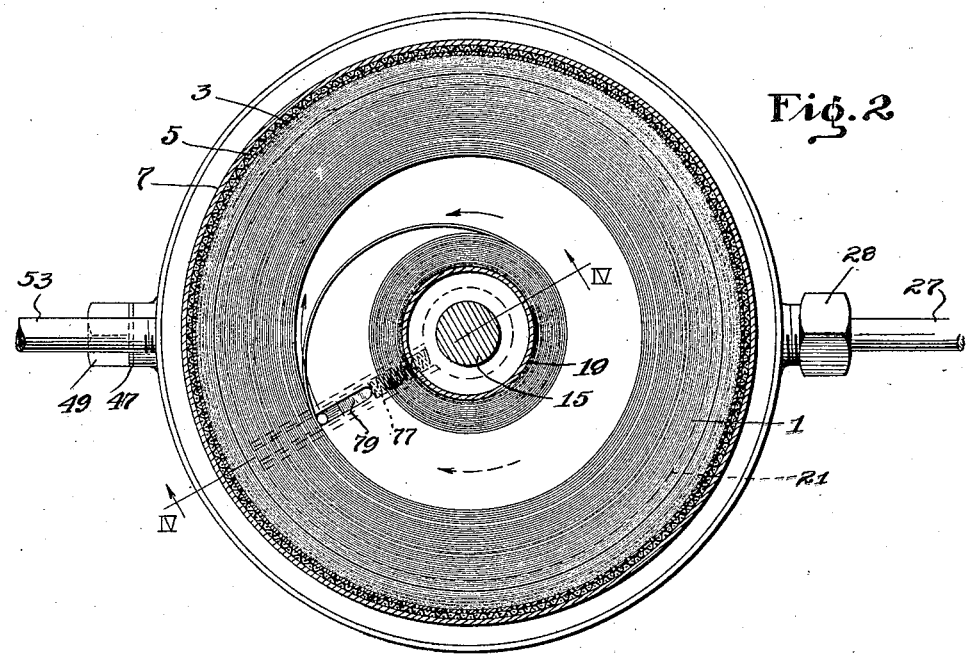
Figure 2 is a section on line II—II of Figure 1 showing winding mechanism for charging the filter with fresh treating material.
Figure 3:
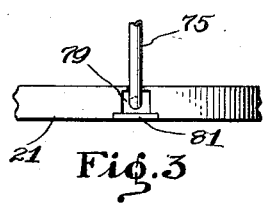
Figure 3 is an end view of the winding pin.
Figure 4:
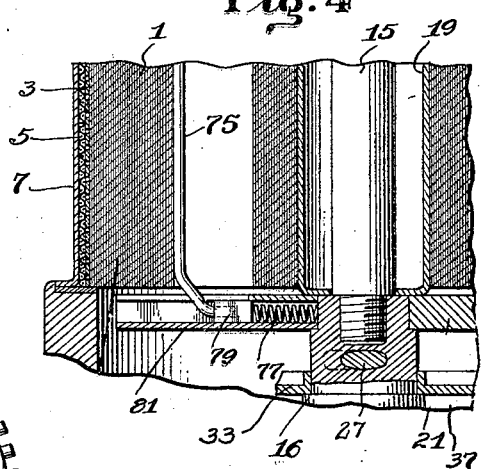
Figure 4 is a cross section on the line IV—IV of Figure 2.

Figures 2, 3 and 4 show an arrangement whereby the fabric may be wound in an annular roll on the inside of perforated filter cylinder 3, while a thin coating of treating solids is being deposited on the windings by means of a liquid passing therethrough and carrying in suspension these treating solids. For this operation pin 23 is removed, or else the spool 19 is turned end for end so as to turn independently of the friction plate 21. The latter carries a winding pin 75 held against the annular roll by means of spring 77 bearing against the square block 79 carrying the pin and movable over closure strip 81 in a radial slot cut in the friction plate. The friction plate and spool rotate respectively in the directions of the full arrows shown in Figure 2 during the charging operation, and the spool and speed control plate rotate respectively in the directions shown by the dotted arrows in Figures 2 and 5 during the treating operation.

The operation of the apparatus thus constructed has been in part indicated in connection with the foregoing description. Oil from a by-pass connection in the lubricating system, such as shown more completely in my co-pending application Serial No. 75,003, filed December 12, 1925, enters the filter through orifice connection 55 and unseats the spring loaded balance check valve 41ª which is loaded sufficiently to prevent oil by-passing from the lubricating system until the oil therein has attained a sufficient pressure to properly lubricate the engine. The relative diameters of the valve 41ª and plunger 41ᵇ are such that the maximum pressure existing in the lubricating system may be utilized in the filter and any predetermined lower pressure maintained in the filter will not appreciably alter the pressure existing in the lubricating system. This balanced check valve need not form an integral part of the filter as shown in Figure 1 but it must be so connected to the filter that any pressure exerted within the filter will oppose the action of the compression spring or other means used to keep the valve on its seat.

The oil upon entering the filter completely fills the chamber and then passes under a differential of pressure through the annular windings on the inside of the perforated filter drum 3, flows through the perforations in this drum and downwardly through the drainage member 5 and out of filtrate outlet 53. This differential in pressure is usually due to the liquid pressure existing within the filter but it may be caused by pump suction on the filtrate outlet.

At the commencement of a filtering operation for purifying or otherwise treating an oil or other liquid, the entire fabric windings with their thin coatings of treating agent, form an annular roll on the inside of the filter drum with the inner end of the winding attached to the winding spool 19 which rotates with exceedingly slow movement. However, with each rotation of the spool, the diameter of the spool and its windings increase and therefore in order that the removal of the exhausted fabric with treating agent coating be constant, the speed must be further and gradually decreased. This result is achieved by every revolution of the friction plate 21 causing the pin 29 to engage with the star wheel 31, which causes the control speed plate 33 to move one tooth, thereby causing the spiral guide, 33ª to move the driver wheel 25 outwardly which results in a slower rotation of the friction plate. After the removal of all the filter windings from the inside of the filter drum onto the storage spool, the friction driver wheel will slip off the outer end of spiral guide 33ª and be moved inwardly by spring 37 to its original position.

The exhausted windings are then removed from the filter chamber, a new roll of fabric placed upon the spool from which a fresh annular filter roll is made ready for use by means of the winding mechanism as shown in Figures 2, 3, and 4, and oil or other liquid containing the treating agent in suspension being forced through the annular windings as they are built upon one another. To precoat or deposit the treating agent on the fresh filter fabric, the pipe 55 is disconnected from the oil supply and a portion of the same oil or other liquid containing the treating agent in suspension is pumped or otherwise forced into the device through the pipe 55 from any suitable reservoir containing a suitable medium in which is mixed the treating agent in desired quantity. This liquid containing the treating agent passes upwardly between the two rolls of the filter fabric and the device will then be operated to transfer the filter fabric from one roll to the other at a constant rate of speed. As the oil or other liquid containing the treating agent passes through the filter fabric, the treating agent may be deposited thereon evenly throughout the surface of the filter fabric. After the entire roll of filter fabric has been treated, the medium carrying the treating agent is removed from the device through drain 56, and the pipe 55 is again connected with the oil supply to be filtered. During the charging of the filter chamber with fresh treating material, the guide control plate 33 is utilized as during the filtering operation and the friction plate 21 is driven at great speed, the charging operations not necessarily requiring more than a few minutes of time. This, of course, depending mostly upon the viscosity or gravity of the liquid used to deposit the treating agent on the windings. This conveying liquid may be treated or untreated by the agent it conveys but it should at least have a very high filtering rate in order that the charging operation may be accomplished with speed.

The filtering period for treating purposes may last for many months, and during the treating of the liquid the impurities may be wholly retained by the first or inner winding, or only the coarser impurities and those of a tarry or slimy nature may be retained by the first winding and the remainder of the impurities distributed throughout the windings, but in which ever way they are retained will depend mostly on the nature of the treating agent used.

It will also be seen that the same apparatus may be used for both treating and charging purposes, but ordinarily it will be found more convenient to use especially designed filters for the manufacture of the annular rolls wherein many rolls may be made up within their perforated cylindrical containers at one time. No other attention will then be required by the motorist or other user than that of simply placing a charging filter roll in its container, attaching the inner end of the fabric to the winding spool, and replacing the cover of the filter chamber.

Having thus described my invention, what I claim is:

1. A process of preparing a filter material consisting of passing a liquid containing a treating agent through a filter fabric to deposit thereupon a precoating, providing other filter fabric above the first filter fabric and precoating, and passing a further portion of liquid containing a treating agent through both filter fabrics and precoating to deposit a precoating on the said other filter fabric.

2. A process of preparing a filter material consisting of passing a liquid containing a treating agent through a filter fabric to deposit the treating agent thereon, providing other filter fabric above the first filter fabric, and then passing a liquid containing a treating agent through both the filter fabrics to deposit the treating agent on the second filter fabric.

3. A process of preparing a filter material in a filter apparatus wherein a filter fabric is transferred from a first roll to a second roll in a continuous operation, which process consists in providing a liquid containing a treating agent in suspension, passing said liquid through the fabric after it is transferred from the first roll to the second roll to deposit the treating agent on the fabric.

4. A process of preparing a filter material in a filter apparatus wherein a continuous band of filter fabric is transferred from a first roll to a second roll in a continuous operation, which process consists in providing a liquid containing a treating agent in suspension, passing said liquid through the fabric after it is transferred from the first roll to the second roll, providing other filter fabric above the first filter fabric, and passing the liquid containing the treating agent through both filter fabrics to deposit the treating agent on the second filter fabric.

5. A process of preparing a filter material in a filter apparatus wherein a continuous band of filter fabric is transferred continuously from a first roll to a second roll, which process consists in providing a liquid containing a treating agent in suspension, passing the liquid through the fabric after it is transferred from the first roll to the second roll, and evenly depositing said treating agent on the fabric by maintaining the delivery of the fabric from the first roll to the second roll constant.

6. A process of preparing a filter material consisting of providing a liquid containing a treating agent in suspension, of winding a fabric in a cylindrical form, and simultaneously applying the treating agent to the fabric by passing the liquid through the cylindrical form in one direction as the fabric is wound thereon.

7. A process of preparing a filter material consisting of providing a liquid containing a treating agent in suspension, of winding a fabric into a hollow form by continuously applying the fabric about one surface thereof, and simultaneously applying the treating agent to the fabric by passing the liquid through the form as the fabric is applied.

In testimony whereof I affix my signature.

FRED W. MANNING.